INVENTOR
Jean Fieux.
Cameron, Kerkam & Sutton
ATTORNEYS

June 19, 1951 J. FIEUX 2,557,422
PIVOT SUSPENSION BEARING FOR VERTICAL SHAFT TURBINES
Filed March 15, 1949 2 Sheets-Sheet 2

INVENTOR
Jean Fieux.

Cameron, Kerkam & Sutton
ATTORNEYS

Patented June 19, 1951

2,557,422

UNITED STATES PATENT OFFICE 2,557,422

PIVOT SUSPENSION BEARING FOR VERTICAL SHAFT TURBINES

Jean Fieux, Paris, France, assignor of one-half to Societe Schneider & Cie, Paris, France, a French company Application March 15, 1949, Serial No. 81,512

15 Claims. (Cl. 308—160)

From studies made by the applicant it appears that in pivot suspension bearings of vertical shaft turbines, of whatever type, most of the too numerous jamming accidents which occur arise from a lack of uniformity of pressure which should exist over the entire extent of the friction surfaces, which lack of uniformity involves the risk of causing a break in the oil film, especially when it is combined with an insufficient organization of the lubrication system.

To avoid these shortcomings it is necessary to adopt a bearing design such that the design itself will normally not involve them, and also such that they are not likely to occur due to deformations which may take place with wear.

The present invention relates to a suspension bearing system wherein equality of pressure over the entire superficial area of the friction surfaces is insured permanently and which is conceived and arranged in such a way that the lubrication of the said friction surfaces can take place under optimum conditions from the point of view both of the circulation of the lubricant and of its maintenance at suitable temperatures.

The bearing in question is characterized mainly by the fact:

—on the one hand, that the surface which supports the surface carrying the rotating pivot is suitably divided so as to reduce the possibilities of deformation of each of its elements and so as to diminish the time of passage and hence the time of working and heating of each of the oil molecules;

—on the other hand, that the aforesaid fractional elements in turn are each supported through the intermediary of a suitable individual, substantially pin-point support leaving them sufficient liberty of orientation and translation, on a single deformable element confined in a limited space, for example a rubber plate suitably disposed. This element insures through hydrostatic effect, so to speak, and for the purpose of obtaining the desired uniformity of pressure, the proper compensation between the stresses transmitted to it by the different fractional elements, the sum of these stresses representing the total load of the rotating mass.

There is described below and on the annexed drawing there is shown by way of example a particular mode of practicing the invention, but it is understood that the practice in question could be effected by any useful accessory arrangement without thereby going beyond the domain of the invention.

Figure 1:
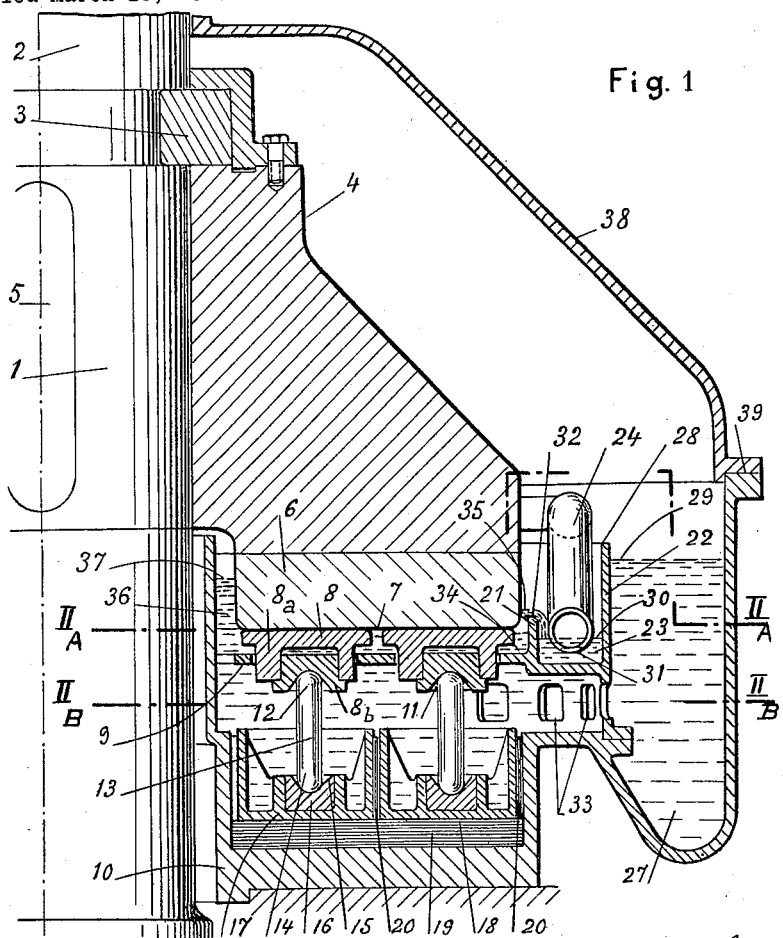
Figure 1 represents a vertical diametrical section cut along I—I of Figure 2.
Figure 3:
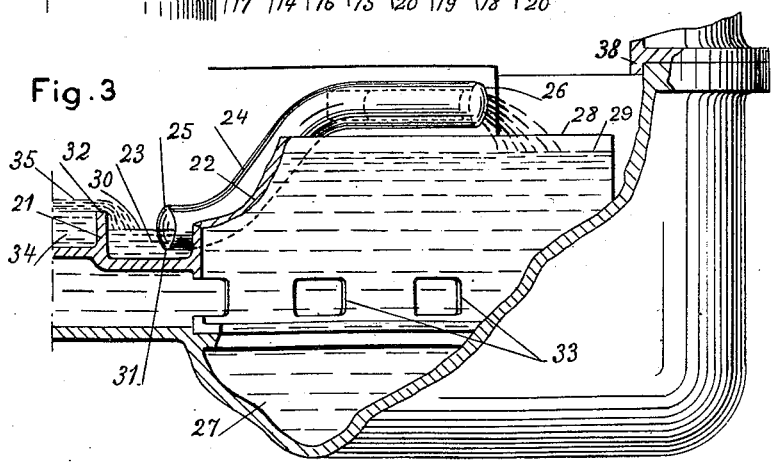
Figure 3 is a partial view in elevation, the observer being supposed to be to the right of Figure 1, and broken away to show how the circulation of the oil is caused dynamically.

As seen in the drawing, the pivot 1 is suspended by its head 2 and through the intermediary of a ring 3 from a rotating block 4 with which it is made rigid by a key 5.

At its lower part the block 4 has a connected element 6 made of a metal such that after machining its lower face 7 can, under satisfactory conditions, play the part of a sliding surface.

According to the invention, the said face 7 reposes on a fractional surface constituted by a series of shoes 8 set with a certain freedom of play in a grating 9 rigid with the general tank 10 to be mentioned later.

In the present case, the said shoes, which are substantially identical, are arranged in the form of two concentrical circular rings, but it is understood that other equivalent arrangements could also be adopted.

As seen in Figure 1, each shoe is made in two parts, 8a and 8b respectively, the upper part 8a being of a metal such that it permits obtaining a satisfactory sliding surface, and the lower part 8b, in which there is hollowed out a spherical recess 11 intended to receive the upper spherical end 12 of a pivot 13, being made of an extremely hard metal particularly capable of resisting wear.

The respective curvatures of the recesses and of the ends of the pivots are of course chosen so as to give the arrangement the proper flexibility and stability at the same time.

The lower spherical end 14 of the pivot 13 reposes in turn and under similar conditions in the spherical recess 15 of a block of hard metal 16, itself embedded in a box 17 whose lower face 18 has the same form and substantially the same dimensions as the upper face of element 8a of the corresponding shoe 8.

Figure 2:
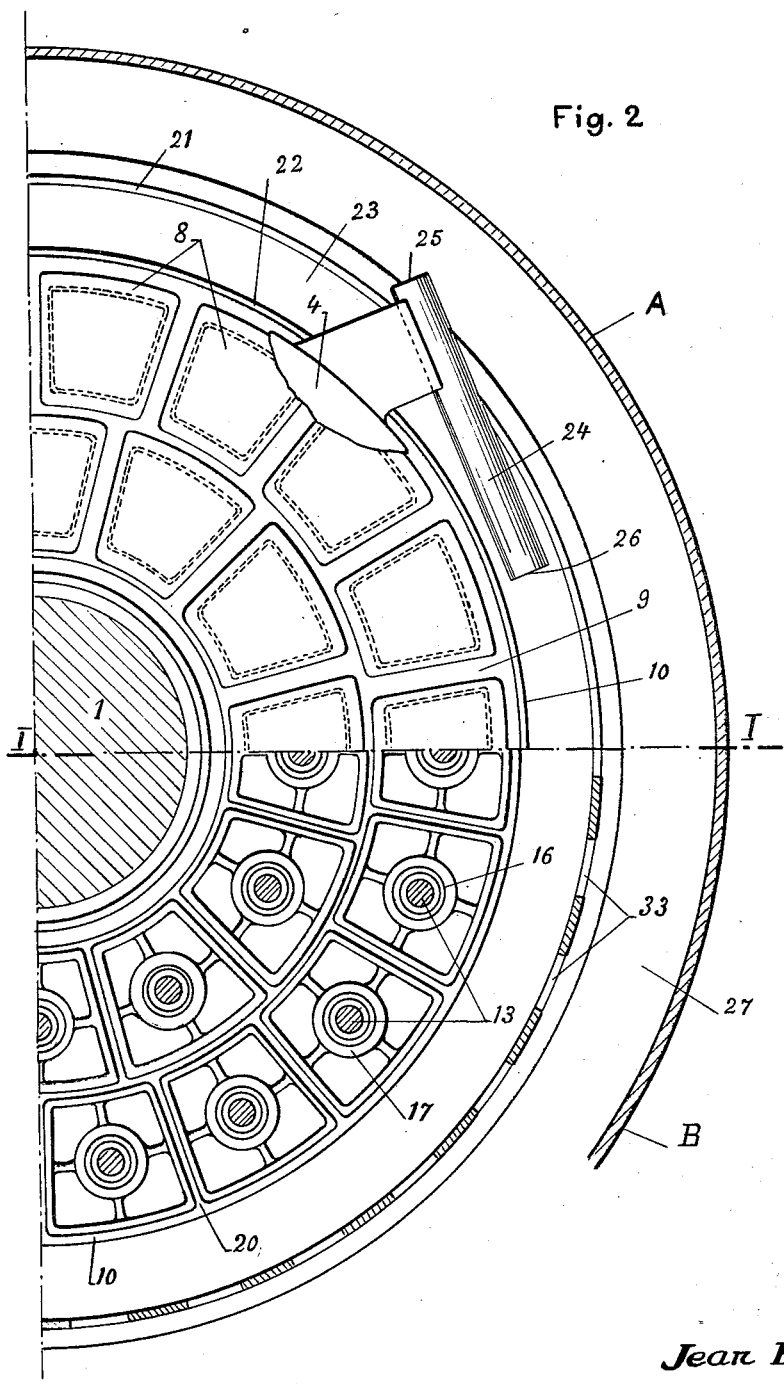
Figure 2 represents, in its upper half A, a plan view of the part of the arrangement which is located directly below the horizontal plane II$^A$—II$^A$ of Figure 1, and in its lower half B, a plan view of the part of the arrangement which is located below the horizontal plane II$^B$—II$^B$.

The different boxes 17 are disposed in relation to each other as indicated in Figure 2—B and they all repose on a rubber plate 19 of relatively great thickness set in the annular tank 10 so as to prohibit all spreading out thereof.

If the rubber plate 19 is of "Buna" rubber, that is, not susceptible to attack by the oil, the slight intervals 20 reserved between the external vertical walls of the different boxes 17 may be left empty.

If, on the contrary, the rubber constituting the plate 19 is susceptible to attack by oil, these intervals should be filled with liquid or plastic substance (mercury, adhesive gum jelly, etc.), capable of resisting oil and of preventing the latter from reaching the plate 19.

As will be seen in the drawing, the tank 10, which is almost completely filled with oil, is divided by vertical partitions 21 and 22 of the grating 9 into a certain number of spaces where, during running and because of the circulation which is established, the oil levels are situated at different heights.

The space comprised between the vertical partitions 21—22 constitutes in effect a kind of gutter 23 inside of which, driven by the rotating block 4 with which it is rigid, there slides a tube or sleeve 24 open at both ends, the lower end 25 of which plunges more or less deeply into the oil contained in the said gutter and the other end of which, the upper end 26, discharges at the upper port of the external cavity 27 above the upper edge 28 of the partition 22.

Consequently, when the pivot 1 and the block 4 begin to rotate and attain a sufficient speed, the oil contained in the gutter 23 rises by inertia through the tube 24 and thus reaches the cavity 27 where the level rises for example to 29, while in the gutter 23 the level establishes itself at 30. This level is situated between the lowest point 31 of the tube 24 and the upper edge 32 of the partition 21 which now begins to form an overflow in relation to the part of the tank 10 in which the shoes are located. Owing to this overflow, the level in this part of the tank 10 constantly tends to sink and would sink throughout to the level of the edge 32 if, through the openings 33, the oil contained in the cavity 27 did not constantly have the tendency, through an effect of communicating vessels, to return to the said central part of the tank.

In fact, in the region 34 of this central part, the level settles at 35 slightly above the edge 32 of the partition 21, while in the region 36, located nearer the axis, it settles at 37 at a height between those of the levels 29 and 35.

Owing to this difference in level, combined with the effect of the centrifugal force, the oil in which the shoes bathe tends constantly to be displaced about them from the center to the periphery, cooling all surfaces with which it is in contact and then becoming cooled itself in the external part 27 of the tank 10 before resuming its lower return circuit.

A casing 38 fastened at 39 on the tank 10 protects the whole of the arrangement.

In the example just described there is provided a circular and radial division comprising two concentrical rings of fractional elements and a common supporting element of rubber.

It is understood that, without going beyond the domain of the invention, one could envisage a further division and a larger number of concentric rings, and also there could be used for making the deformable supporting element common to all shoes any substance which would permit giving rise to the necessary hydrostatic compensation effect.

It is easy to understand that, owing to the whole of the arrangements thus adopted, there is obtained, on the one hand, a satisfactory distribution and equalization of the stresses and of the pressure and that, on the other hand, a judicious use of the oil is achieved both from the viewpoint of lubrication and from the viewpoint of cooling of the friction surfaces, the consequence being that all jamming risk is avoided.

What is claimed is:

1. A pivot suspension bearing for a vertical shaft turbine comprising a rotating bearing member connected with the turbine shaft and having a supporting friction surface, non-rotating friction means cooperating with said surface to support said bearing member and shaft, said means being divided radially and circumferentially to form a plurality of separate friction elements, a common base member of deformable material for said friction elements, a rigid supporting bed for said base member and means confining the sides of said base member against lateral expansion, and individual friction element supports for mounting each friction element above and on said base member independently of the other friction elements, each friction element support having a universal connection with its friction element, said base member yielding under the pressure of one of said supports and expanding under an adjacent support to equalize the pressures between the associated friction elements and said friction surface.

2. A bearing as defined in claim 1, said base member being made of rubber.

3. A bearing as defined in claim 1, said friction elements being arranged in the form of two concentric rings.

4. A bearing as defined in claim 1, each of said friction element supports including a foot of substantially the same size and shape as its frictional element and resting on said base member, and a vertical pin having universal connection at its upper end with the friction element and at its lower end with the foot.

5. A pivot suspension bearing for a vertical shaft turbine comprising a rotating bearing member connected with the turbine shaft and having an annular friction surface surrounding the axis of the shaft, non-rotating friction means cooperating with said surface to support the bearing member and shaft, said means being divided radially and circumferentially to form a plurality of separate friction elements arranged in concentric rows and substantially covering the annular area of said surface, a common annular base member of deformable material for said friction elements and substantially coextensive with said surface, a rigid supporting bed for said base member including inner and outer rings confining the edges of said member against lateral expansion, and individual friction element supports for mounting each friction element above and on said base member, each of said friction element supports including a foot member resting on said base member beneath its friction element and a vertical element extending between and having universal connection at its ends with said foot and friction element.

6. A bearing as defined in claim 5, the friction elements of said concentric rows all having substantially the same radial and circumferential extent and substantially the same shape.

7. A bearing as defined in claim 6, said feet corresponding in arrangement, size and shape with said friction elements.

8. A bearing as defined in claim 7, each friction element and its foot having aligned substantially spherical recesses, and a vertical supporting pin extending between each friction element and its foot with the opposite ends of the pin seated in said recesses.

9. A pivot suspension bearing for a vertical shaft turbine comprising a rotating bearing member connected with the shaft and having an annular friction surface surrounding the axis of the shaft, a bearing housing the lower part of which comprises an annular channel beneath and substantially coextensive with said surface, a base member in the form of a flat ring of deformable material seated in the bottom of said channel and confined therein against lateral expansion, and a plurality of separate friction supporting means interposed between said base ring and said surface for supporting said bearing member and shaft, each of said means including a friction shoe engaging said surface, a foot member engaging said base ring, and a vertical support interposed between and having universal connection with said foot member and shoe.

10. A bearing as defined in claim 9 wherein said friction shoes all have substantially the same shape and size and are arranged in a plurality of concentric rows around the axis of the shaft so as to support said annular friction surface over substantially its entire area.

11. A bearing as defined in claim 10 wherein each foot member has substantially the same size and shape as its corresponding friction shoe.

12. A pivot suspension bearing for a vertical shaft turbine comprising a rotating bearing member connected with the shaft and having an annular friction surface surrounding the axis of the shaft, an annular bearing housing surrounding the shaft the lower part of which comprises an annular channel substantially coextensive within and beneath said friction surface, a base member in the form of a flat ring of deformable material seated in the bottom of said channel and confined therein against lateral expansion, said annular housing containing an oil bath and said bearing member dipping into the bath to immerse said friction surface in the oil, a plurality of separate friction supporting means interposed between said base ring and said surface for supporting said bearing member and shaft, each of said means including a friction shoe engaging said surface, a foot member engaging said base ring, and a vertical support interposed between and having universal connection with said foot member and shoe, and means for establishing oil circulation around said shoes and surface including housing walls surrounding said surface and forming an oil gutter, the top of the inner wall of the gutter being slightly above the level of said surface and the outer wall being substantially higher, means connected to and rotating with said bearing member for scooping oil from said gutter and discharging it over said outer wall into the outer part of said housing, and means forming a communication between said outer part of the housing and the inner part thereof at a level below said gutter.

13. A pivot suspension bearing for a vertical shaft comprising a rotating bearing member connected with said shaft and having a supporting friction surface, non-rotating friction means cooperating with said surface to support said bearing member and shaft, said means being divided to form a plurality of separate friction elements, a common base member of deformable material for said friction elements, a rigid supporting bed for said base member and means confining the sides of said base member against lateral expansion, and means for mounting each friction element above and on said base member independently of the other friction elements comprising a grill-like structure fixed with respect to said bed and having openings in which said friction elements are guided, and individual friction element supports on said base member, each friction element support having a universal connection with its friction element.

14. A bearing as defined in claim 13, said friction means being divided both radially and circumferentially and said friction elements being arranged in the form of concentric rings.

15. A bearing as defined in claim 13, each of said friction element supports including a foot of substantially the same size and shape as its friction element and resting on said base member, and a vertical pin having universal connection at its upper end with the friction element and at its lower end with the foot.

JEAN FIEUX.

REFERENCES CITED

The following references are of record in the file of this patent:

UNITED STATES PATENTS

| Number | Name | Date |
| --- | --- | --- |
| 1,387,930 | Kingsbury | Aug. 16, 1921 |